(12) United States Patent
Saigusa

(10) Patent No.: US 11,500,597 B2
(45) Date of Patent: Nov. 15, 2022

(54) SERVER SYSTEM, AND PRINTING APPARATUS HAVING CAPABILITY INFORMATION IDENTIFIED BY DIFFERENT SERVER SYSTEM AND USED FOR DISPLAYING PRINT SETTING SCREEN

(71) Applicant: CANON KABUSHIKI KAISHA, Tokyo (JP)

(72) Inventor: Hirokazu Saigusa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/156,402

(22) Filed: Jan. 22, 2021

(65) Prior Publication Data
US 2021/0240415 A1    Aug. 5, 2021

(30) Foreign Application Priority Data

Jan. 31, 2020    (JP) .............................. JP2020-015841

(51) Int. Cl.
| | | |
|---|---|---|
| *G06F 15/00* | (2006.01) | |
| *G06F 3/12* | (2006.01) | |
| *G06K 1/00* | (2006.01) | |
| *H04L 67/51* | (2022.01) | |

(52) U.S. Cl.
CPC .......... *G06F 3/1232* (2013.01); *G06F 3/1204* (2013.01); *G06F 3/1231* (2013.01); *H04L 67/51* (2022.05); *G06F 3/1287* (2013.01)

(58) Field of Classification Search
CPC .... G06F 3/1232; G06F 3/1204; G06F 3/1231; G06F 3/1287; H04L 67/16
USPC .............................. 358/1.15, 1.14, 1.13, 1.1
See application file for complete search history.

(56) References Cited

U.S. PATENT DOCUMENTS

| | | | | |
|---|---|---|---|---|
| 2007/0106910 | A1* | 5/2007 | Mizuno .............. | H04N 1/00344 713/189 |
| 2008/0068649 | A1* | 3/2008 | Emori ................... | G06F 3/1226 358/1.15 |
| 2013/0321861 | A1 | 12/2013 | Ishihara et al. | |
| 2015/0169267 | A1* | 6/2015 | Hirakawa ............. | G06F 3/1206 358/1.13 |
| 2015/0363139 | A1* | 12/2015 | Ishihara ................ | G06F 3/1287 358/1.14 |
| 2019/0361636 | A1* | 11/2019 | Ren ....................... | G06F 3/1287 |
| 2020/0004473 | A1 | 1/2020 | Saigusa | |

FOREIGN PATENT DOCUMENTS

JP    2013-238924 A    11/2013

* cited by examiner

*Primary Examiner* — Douglas Q Tran
(74) *Attorney, Agent, or Firm* — Canon U.S.A., Inc. IP Division

(57) ABSTRACT

A server system includes a first receiving unit configured to receive, from a printing apparatus operated by a user, a registration request for information regarding the printing apparatus, an acquisition unit configured to acquire information to be used for acquisition of capability information of the printing apparatus, from the printing apparatus that has transmitted the registration request, a transmission unit configured to transmit the acquired information to a different server system, and a second receiving unit configured to receive, from the different server system, capability information of the printing apparatus that is identified by the different server system based on the transmitted information.

16 Claims, 13 Drawing Sheets

FIG.5A

| DEVICE NAME | HWID | COID | IP ADDRESS | PACKAGE |
|---|---|---|---|---|
| iR-ADV CCCC | iR-ADV_CCCC61B1 | xxyyzz | xxx.xxx.xxx.001 | package C |
| iR-ADV XXXX | iR-ADV_XXXXD80D | xxyyzz | xxx.xxx.xxx.111 | package D |
| AAAA | AAAACF39 | aaabbb | xxx.xxx.xxx.222 | null |
| YYYY | YYYY62B5 | abcabc | xxx.xxx.xxx.234 | null |

FIG.5B

| PACKAGE NAME | HWID | COID | PACKAGE | APPLICATION IDENTIFIER | EXTENSION |
|---|---|---|---|---|---|
| A-Driver | iR-ADV_CCCC61B1 | xxyyzz | package A | | FALSE |
| B-Driver | iR-ADV_XXXXD80D | xxyyzz | package B | | FALSE |
| C-Driver | AAAACF39 | xxyyzz | package C | AAAAA_AA | TRUE |
| D-Driver | YYYY62B5 | xxyyzz | package D | BBBBB_BB | TRUE |

FIG.5C

| APPLICATION NAME | APPLICATION IDENTIFIER | APPLICATION PACKAGE |
|---|---|---|
| A-company App | AAAAA_AA | package AA |
| B-company App | BBBBB_BB | package BB |
| C-company App | CCCCC_CC | package CC |
| D-company App | DDDDD_DD | pakcage DD |

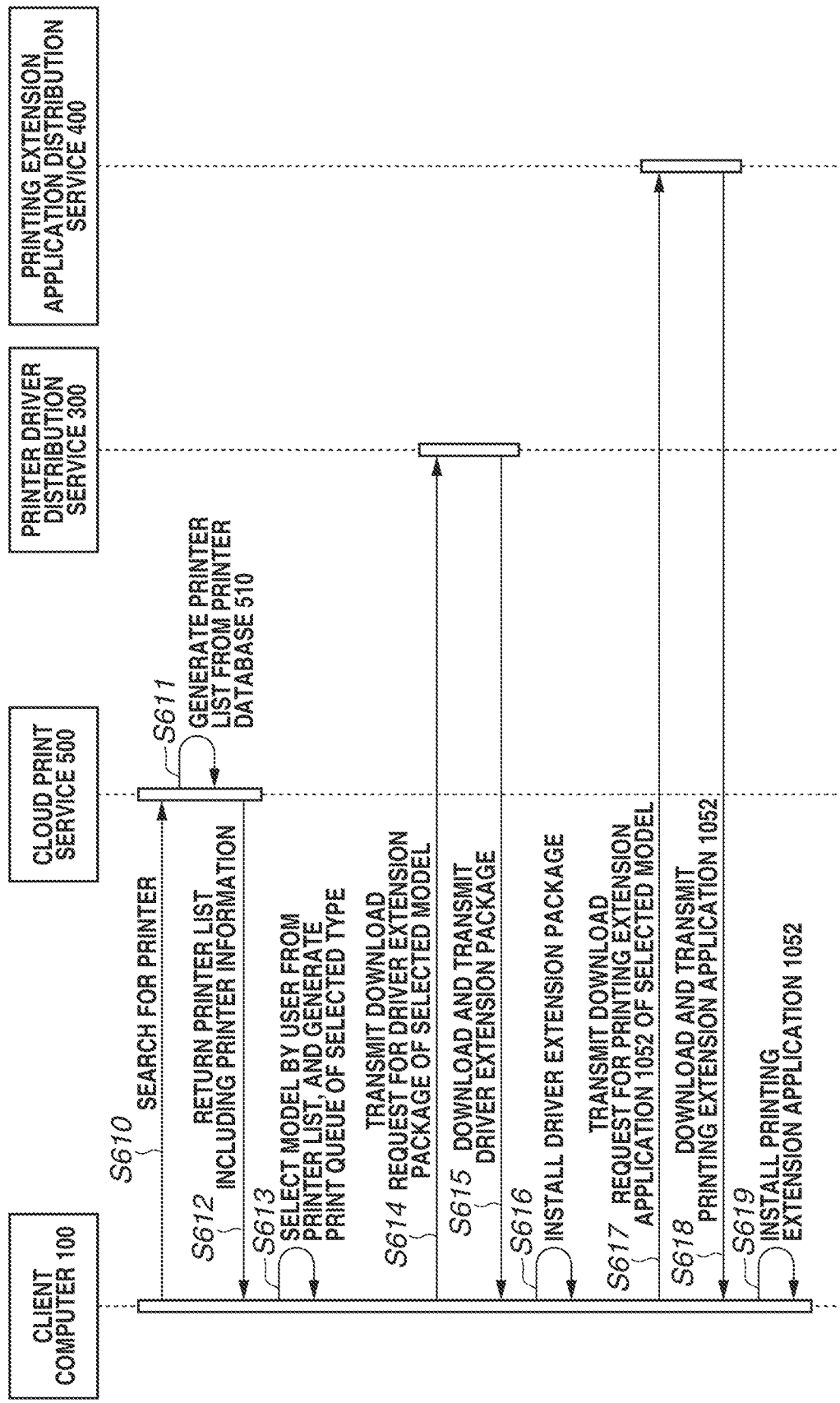

FIG.7

CLOUD PRINT SERVICE                                                                  700

Taro Yamada          UPDATE    NUMBER OF DOCUMENTS
                                        5

| DOCUMENT NAME | COLOR MODE | DUPLEX | MULTIPLE PAGE | NUMBER OF COPIES | DATE/TIME |
|---|---|---|---|---|---|
| ■ aaa.doc | COLOR | ONE-SIDED | 1in1 | 1 | 01/14 10:19 |
| ☐ ddd.doc | MONOCHROME | ONE-SIDED | 1in1 | 5 | 01/14 10:19 |
| ☐ eee.pdf | MONOCHROME | DUPLEX | 1in1 | 1 | 01/14 10:19 |
| ☐ hhh.doc | COLOR | ONE-SIDED | 1in1 | 1 | 01/14 10:20 |
| ☐ jjj.pdf | MONOCHROME | ONE-SIDED | 1in1 | 1 | 01/14 10:20 |

◁ ▷  ◁◁ ▷▷  1/1

SELECT ALL   CANCEL SELECTION   DELETE       PRINT

LOGOUT

FIG.9

```
{
    "Duplex": ["Dupex", "One-Side"],
901 ~ "Color": ["Mono", "Color"],
    "Orientation": ["Portrait", "Landscape"],
    ...
    ...
902 ~ "Extension_Setting1": ["Extension_option1", "Extension_option2"],
    "Extension_Setting2": ["Extension_option1", "Extension_option2"],
}
```

SERVER SYSTEM, AND PRINTING APPARATUS HAVING CAPABILITY INFORMATION IDENTIFIED BY DIFFERENT SERVER SYSTEM AND USED FOR DISPLAYING PRINT SETTING SCREEN

BACKGROUND OF THE INVENTION

Field of the Invention

The present invention relates to a server system, and a printing apparatus that communicates with a server system.

Description of the Related Art

As discussed in Japanese Patent Application Laid-Open No. 2013-238924, there has been known a printing system in which a user preliminarily registers information regarding a printing apparatus in a cloud print service, and print data transmitted to the printing apparatus via the cloud print service is printed by the printing apparatus.

The user accesses the cloud print service from an information processing apparatus such as a personal computer (PC), selects a printing apparatus to be used for printing, from among printing apparatuses registered in the cloud print service, and issues a printing instruction of the print data.

The information processing apparatus generates a print job, and inputs the generated print job to a print queue on the cloud print service. The printing apparatus accesses the cloud print service, acquires a print job spooled in the print queue generated on the cloud print service, and outputs the acquired print job.

Representative examples of the cloud print service include Google Cloud Print® discussed in Japanese Patent Application Laid-Open No. 2013-238924, Microsoft Hybrid Cloud Print®, and uniFLOW Online®.

By registering capability information of a printing apparatus to be used into the cloud print service, when registering a print queue into the cloud print service, it becomes possible to provide a user with a print setting screen suitable for the printing apparatus to be used for printing. Conceivable methods of registering capability information of a printing apparatus into the cloud print service include a method of storing capability information in a printing apparatus and acquiring the capability information from the printing apparatus. However, capability information that can be acquired by the cloud print service from the printing apparatus is limited to standardized items.

SUMMARY OF THE INVENTION

According to an aspect of the present invention, a server system includes a first receiving unit configured to receive, from a printing apparatus operated by a user, a registration request for information regarding the printing apparatus, an acquisition unit configured to acquire information to be used for acquisition of capability information of the printing apparatus, from the printing apparatus that has transmitted the registration request, a transmission unit configured to transmit the acquired information to a different server system, and a second receiving unit configured to receive, from the different server system, capability information of the printing apparatus that is identified by the different server system based on the transmitted information.

Further features of the present invention will become apparent from the following description of exemplary embodiments with reference to the attached drawings.

BRIEF DESCRIPTION OF THE DRAWINGS

FIG. 5A is a table illustrating an example of an information database of a printer that is held by the cloud print service according to the first exemplary embodiment.

FIG. 5B is a table illustrating an example of an information database of a printer that is held by the printer driver distribution service according to the first exemplary embodiment.

FIG. 5C is a table illustrating an example of an information database of a printer that is held by the printing extension application distribution service according to the first exemplary embodiment.

FIG. 6 is a sequence diagram illustrating an example of a sequence of installing a print setting application onto the client computer according to the first exemplary embodiment.

FIG. 7 is a diagram illustrating an example of an operation panel displaying a printable job list received from the cloud print service according to the first exemplary embodiment.

FIG. 9 is a diagram illustrating an example of an extended print setting according to the first exemplary embodiment.

DESCRIPTION OF THE EMBODIMENTS

Figure 1:
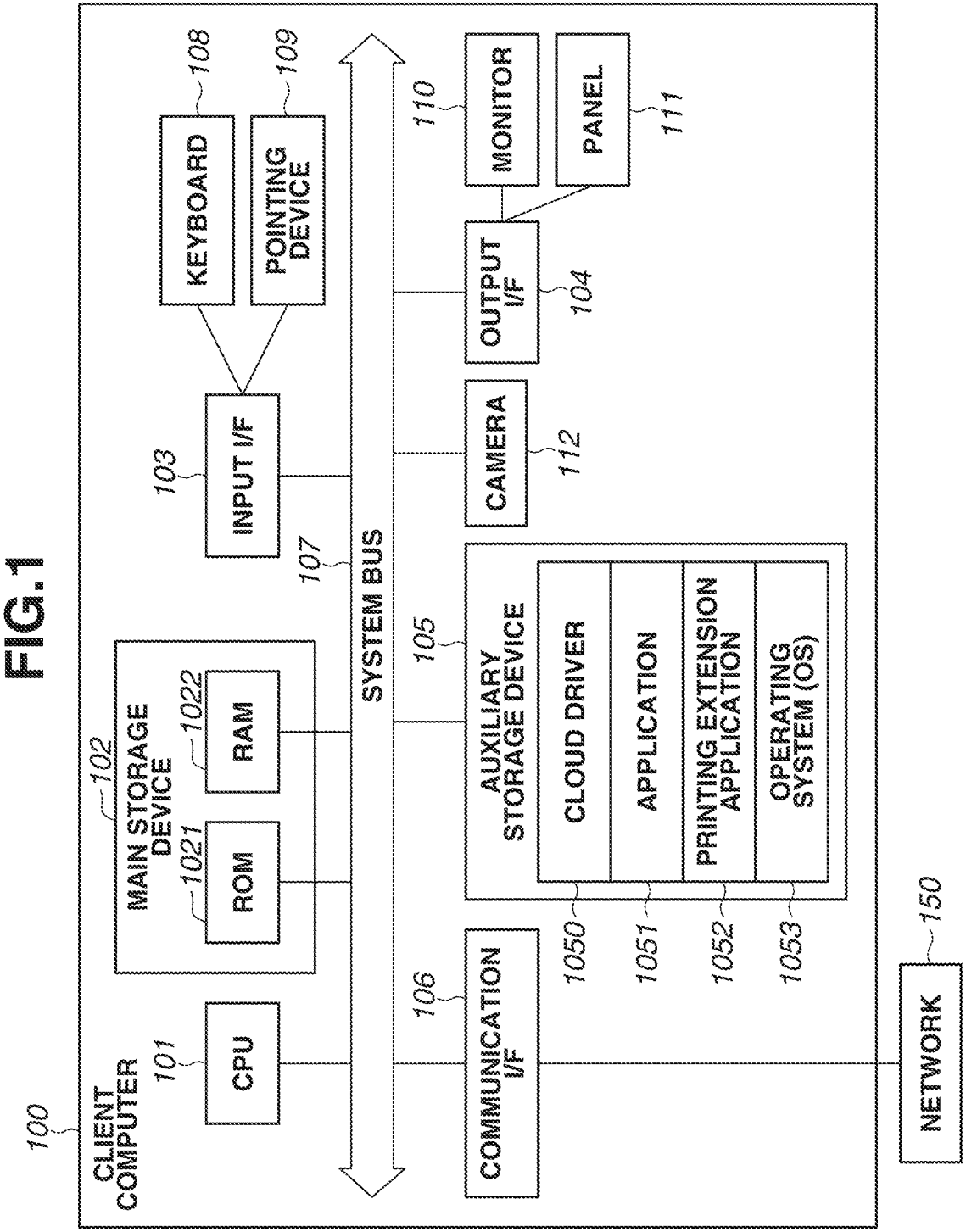
FIG. 1 is a block diagram illustrating an example of a hardware configuration of a client computer according to a first exemplary embodiment.

FIG. 1 is a hardware configuration diagram of a client computer (information processing apparatus) that uses a cloud print service according to a first exemplary embodiment. The detailed description will be given below.

A central processing unit (CPU) 101 controls the entire apparatus based on a program stored in a read-only memory (ROM) 1021 or a random access memory (RAM) 1022 of a main storage device 102, or an auxiliary storage device 105.

The RAM 1022 is also used as a work area when the CPU 101 performs various kinds of processing. The auxiliary storage device 105 records a cloud driver 1050, an operating system (OS) 1053, an application 1051, and a printing extension application 1052. In the following description, the main storage device 102 and the auxiliary storage device 105 will be collectively described as a storage device.

Input devices such as a pointing device 109 and a keyboard 108 that are represented by a mouse and a touch panel are devices connected to a system bus 107 via an input interface (I/F) 103, for the user issuing various instructions to a computer.

An output I/F 104 is an interface for outputting data to the outside, and outputs data to an output device such as a monitor 110 and a panel 111. In addition, a client computer 100 is equipped with a camera 112 to have an image capturing function.

The client computer 100 is connected Via a communication I/F 106 and a network 150 with a printer 200 and systems, which will be described below with reference to FIG. 2. In addition, data exchange is performed between the I/Fs and modules via the system bus 107.

Figure 2:
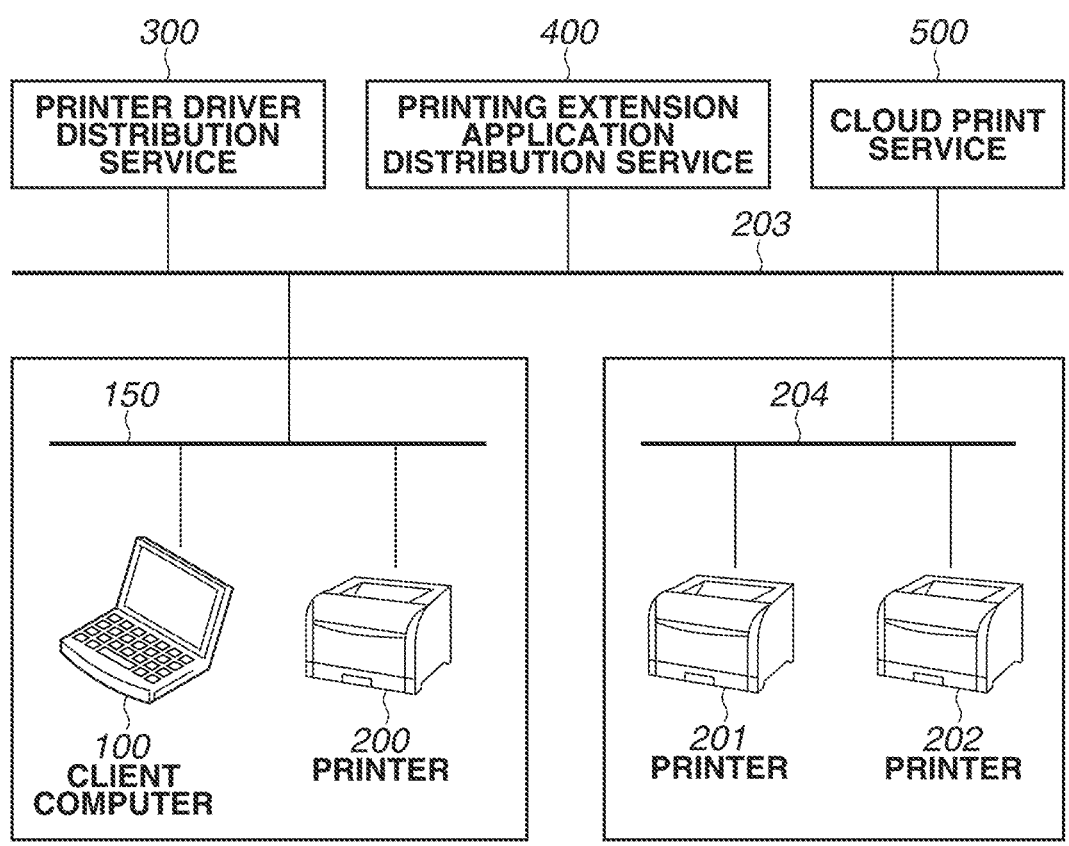
FIG. 2 is a block diagram illustrating an example of a network configuration according to the first exemplary embodiment.

FIG. 2 is a block diagram of a printing system schematically illustrating a network environment according to the present exemplary embodiment.

The client computer 100 and the printer 200 are connected to the network 150. The client computer 100 and the printer 200 are connected to the same intranet, and can communicate with each other.

In addition, printers 201 and 202 are connected to a different intranet 204, and the network 150 is connected to the intranet 204 via an Internet 203. A printer driver distribution service 300, a printing extension application distribution service 400, and a cloud print service 500 are connected to the Internet 203.

The printer driver distribution service 300 is a server system including one or a plurality of information processing apparatuses that executes a web-based service of distributing a printer driver to the client computer 100. The client computer 100 searches for the printer 200 using a protocol such as the Web Services for Devices (WSD) or the Internet Printing Protocol (IPP). The client computer 100 acquires a printer driver based on printer identification information of the discovered printer 200, from the printer driver distribution service 300, and installs the acquired printer driver. A printer driver registered in the printer driver distribution service 300 is updated by a printer vendor. The client computer 100 automatically or manually acquires a new-version printer driver from the printer driver distribution service 300, and updates the installed printer driver with the acquired new-version printer driver.

The printing extension application distribution service 400 is a server system that executes a service of distributing an application to be executed by the client computer 100. A printing extension application is an application for extending a printing function to be provided by a cloud print service or an OS. A printing function provided by a cloud print service or an OS only enables a print setting of a general function that can be used by a printer of any vendor, such as a color mode and duplex printing. By using the printing extension application, it becomes possible to make a print setting of a printing function that cannot be made by a printing function provided by a cloud print service or an OS, such as stapleless stapling, poster printing, or booklet printing.

If the client computer 100 receives a user operation of requesting the install of a printing extension application, the client computer 100 accesses the printing extension application distribution service 400 and installs a printing extension application. In addition, if an application identifier is described in an information (Inf) file of a printer driver installed on the client computer 100, a printing extension application is installed. The client computer 100 accesses the printing extension application distribution service 400 and installs a printing extension application corresponding to the application identifier described in the Inf file.

The cloud print service 500 is a service that is constructed on a cloud, and is a server system including one or a plurality of information processing apparatuses. In the present exemplary embodiment, the cloud print service 500 can connect to each intranet, and connect with the client computer 100 and the printers 200, 201, and 202 via the Internet. The cloud print service 500 is under the account management that uses a user identification (ID) and a password, and the client computer 100 accesses the cloud print service 500 using account information input by the user.

In the present exemplary embodiment, the client computer 100 is assumed to store in advance uniform resource locators (URLs) of the cloud print service 500 and the printing extension application distribution service 400. In addition, the cloud print service 500 is assumed to store in advance a URL of the printer driver distribution service 300.

Figure 3A:
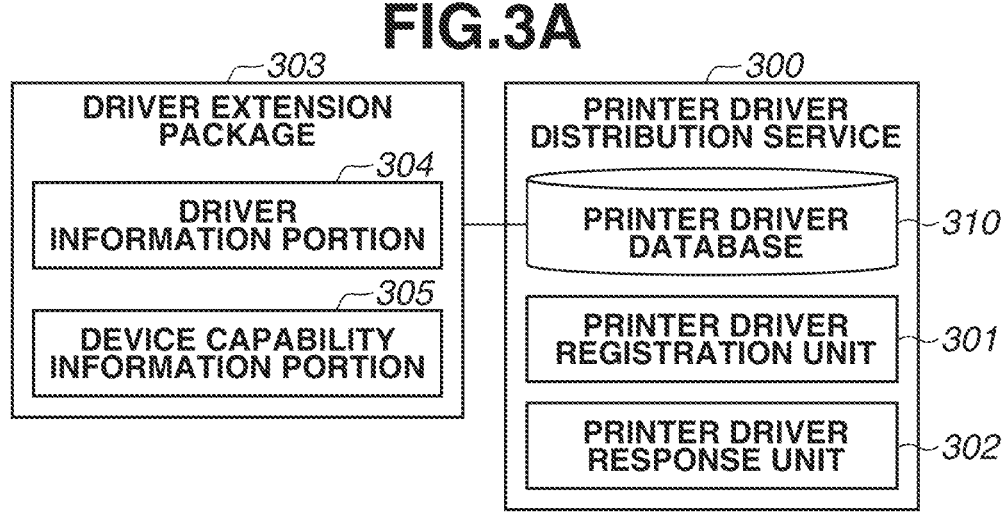
FIG. 3A is a block diagram illustrating an example of a functional blocks of a printer driver distribution service according to the first exemplary embodiment.

FIG. 3A is a block diagram illustrating an example of a functional blocks of the printer driver distribution service 300. The printer driver distribution service 300 is a server system including one or a plurality of information processing apparatuses having a configuration similar to that of the information processing apparatus illustrated in FIG. 1. A printer driver registration unit 301 and a printer driver response unit 302 are implemented by a CPU of an information processing apparatus included in the printer driver distribution service 300, executing programs.

The printer driver distribution service 300 is a service existing on a cloud connected to the Internet, and enables a package related to a printer driver, to be distributed to an external service or the client computer 100. The package related to a printer driver is a printer driver or a driver extension package, for example.

When the printer driver registration unit 301 receives a registration instruction of a package related to a printer driver, from an external service and the client computer 100, the printer driver registration unit 301 registers an uploaded package into a printer driver database 310. The printer driver registration unit 301 registers, for example, a printer driver distributed by a printer vendor, or a driver extension package for extending a printer driver into the printer driver database 310.

When a request for a package related to a printer driver is received from an external service or the client computer 100, the printer driver response unit 302 acquires a corresponding package from the printer driver database 310 and transmits a response including the acquired package. For example, when a request for a printer driver supporting the printer 200 in which a print queue is generated is received from the client computer 100, the printer driver response unit 302 reads a printer driver supporting the printer 200 from the printer driver database 310, and transmits the read printer driver to the client computer 100. In addition, the printer driver response unit 302 receives an acquisition request for a driver extension package for extending an installed printer driver, from the client computer 100. The printer driver response unit 302 reads a driver extension package corresponding to a requested printer driver, from the printer driver database 310, and transmits the read driver extension package to the client computer 100.

A database to be described below with reference to FIG. 5B is stored in the printer driver database 310. In addition to printer drivers supporting various printers, a driver extension package 303 is also stored in the printer driver database 310.

The driver extension package 303 is an example of a package to be distributed from the printer driver distribution service 300. The driver extension package 303 includes a driver information portion 304 and a device capability information portion 305. The driver information portion 304 includes a hardware identification (HWID) and a Compatible ID (COID) for identifying a driver, information indicating that a corresponding package is a driver extension package, and information regarding a version of the driver extension package 303. The device capability information portion 305 includes device capability information and prohibition information of a corresponding printer 200. The device capability information is information regarding a folding position and a folded portion in booklet printing, or information regarding mixed sheet printing for executing one job using sheets of different sizes or types, for example.

Figure 3B:
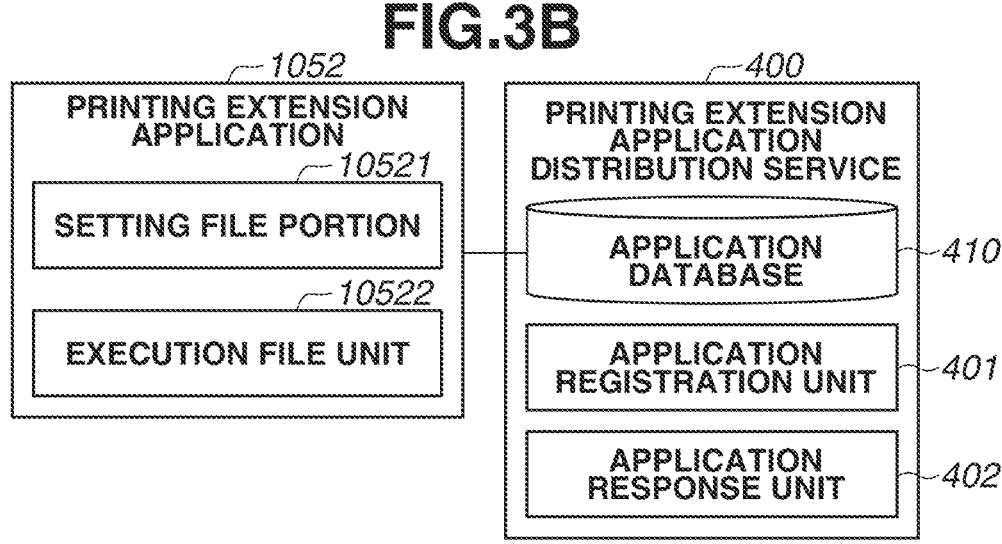
FIG. 3B is a block diagram illustrating an example of a functional blocks of a printing extension application distribution service according to the first exemplary embodiment.

FIG. 3B is a block diagram illustrating an example of a functional blocks of the printing extension application distribution service 400. An application registration unit 401 and an application response unit 402 are implemented by a CPU(s) of one or a plurality of information processing apparatuses included in the printing extension application distribution service 400, executing programs.

The printing extension application distribution service 400 is a service existing on a cloud connected to the Internet, and enables a printing extension application to be distributed to an external service or the client computer 100. An application that can be distributed by the printing extension application distribution service 400 is not limited to the printing extension application 1052, and the printing extension application distribution service 400 may be able to distribute another application.

When a registration instruction of the printing extension application 1052 or another application is received from an external service or the client computer 100, the application registration unit 401 registers an uploaded application into an application database 410.

When an acquisition request for the printing extension application 1052 is received from an external service or the client computer 100, the application response unit 402 acquires a corresponding application from the application database 410 and transmits the acquired application to a request source.

The application database 410 is a database in which information regarding a print setting application distributed by a vendor and for which a registration request is received from an external service or the client computer 100 is registered. The details of information to be registered in the application database 410 will be described below with reference to FIG. 5C.

The printing extension application 1052 according to the present exemplary embodiment includes a setting file portion 10521 and an execution file unit 10522. The setting file portion 10521 includes information such as an identifier for identifying the printing extension application 1052, and an HWID and a COID for identifying a compatible printer 200. The execution file unit 10522 is an execution file unit of the printing extension application 1052. The execution file unit 10522 can receive a push notification from a print setting user interface (UI) or an external service, and display the received push notification.

Figure 3C:
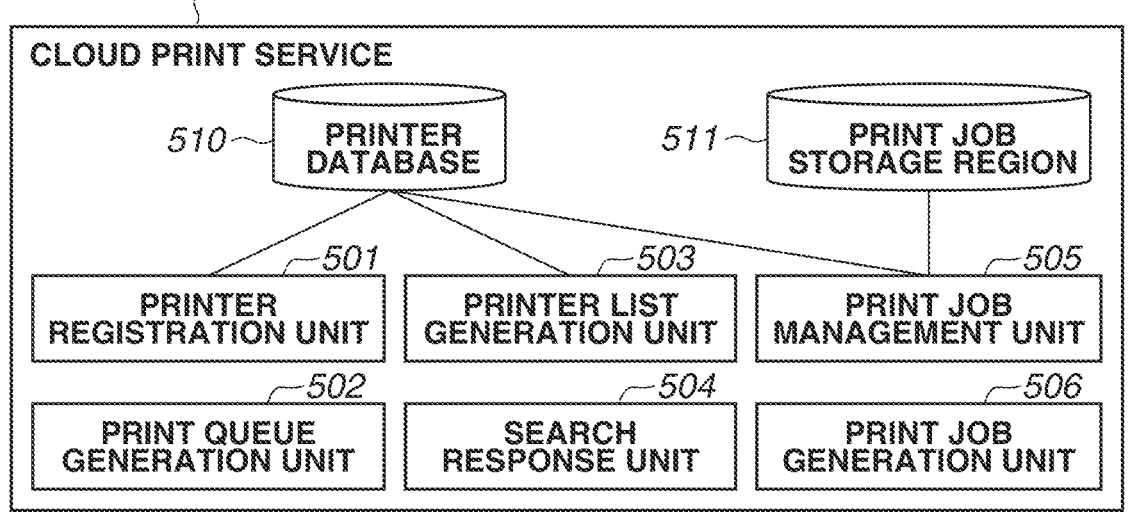
FIG. 3C is a block diagram illustrating an example of a functional blocks of a cloud print service according to the first exemplary embodiment.

FIG. 3C is a functional block diagram of the cloud print service 500 according to the present exemplary embodiment. Each functional block is implemented by a CPU(s) of one or a plurality of information processing apparatuses included in the cloud print service 500, executing a program.

The cloud print service 500 is a service existing on a cloud connected to the Internet, and enables the provision of a function related to a printing. In the present exemplary embodiment, the cloud print service 500 has functions of a printer registration unit 501, a print queue generation unit 502, a printer list generation unit 503, a search response unit 504, and a printer database 510. Furthermore, the cloud print service 500 has functions of a print job management unit 505, a print job generation unit 506, and a print job storage region 511. Alternatively, these functions may be provided on another cloud print service cooperating with the cloud print service 500.

The following description will be given of an example case where the printer 200 is registered in the cloud print service 500, and printing is performed using the printer 200. Similar processing can also be implemented by the printer 201 or 202 connectable with the cloud print service 500.

When a printer registration instruction is received from the printer 200, the printer registration unit 501 generates a print queue using the print queue generation unit 502, and registers the generated print queue into the printer database 510 in association with printer identification information. A state in which a print queue of a printer and printer identification information are registered in association with each other in this manner will be described as a state in which a printer is registered. In some cases, various attributes are added to the registered printer. For example, various attributes include a location of the printer.

In accordance with the control of the printer registration unit 501, the print queue generation unit 502 generates a print queue on the cloud print service 500. If the client computer 100 issues a printing instruction, a print job is registered into the print queue generated by the print queue generation unit 502.

The printer list generation unit 503 generates a list of registered printers. When the client computer 100 requests a list of printers registered in the cloud print service 500, the printer list generation unit 503 generates a list of printers.

Based on printer search performed on the cloud print service 500 by the client computer 100, the search response unit 504 transmits, to the client computer 100, a response including information regarding registered printers.

The print job management unit 505 receives image data and a print setting from the client computer 100, and transmits, to the printer 200, a print job generated by the print job generation unit 506. In addition, the print job management unit 505 stores into the print job storage region 511 a print job generated by the print job generation unit 506.

The printer database 510 is a database storing information regarding printers registered in the cloud print service 500. Items stored in the printer database 510 will be described below with reference to FIG. 5A.

First of all, processing of registering the printer 200 into the cloud print service 500 will be described.

Figure 4:
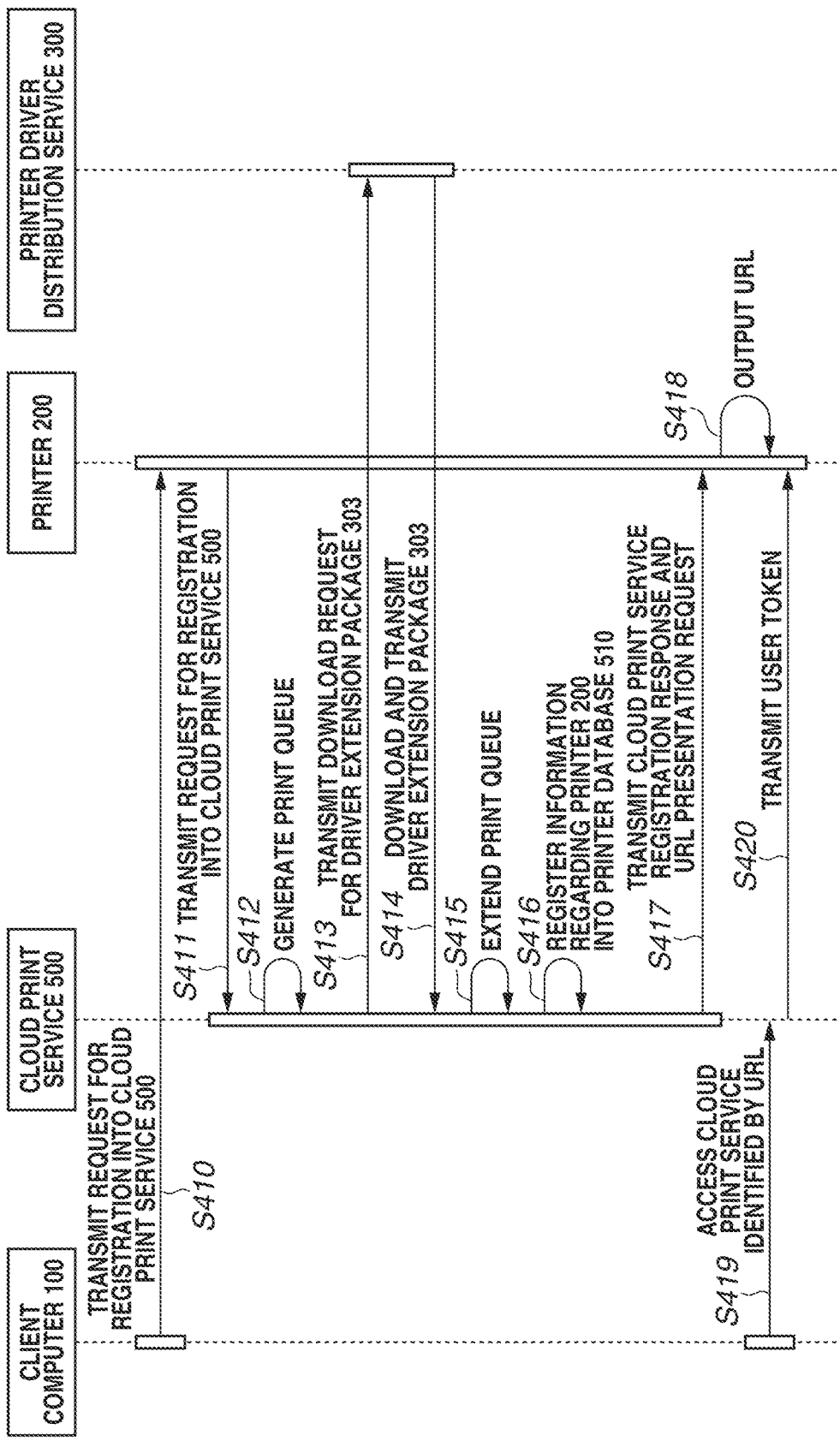
FIG. 4 is a sequence diagram illustrating an example of a sequence of registering a printer in the cloud print service according to the first exemplary embodiment.

FIG. 4 is a sequence diagram illustrating processing of registering the printer 200 into the cloud print service 500 according to the present exemplary embodiment. In the present exemplary embodiment, by accessing the printer 200 from the client computer 100 and operating the printer 200, a registration request of the printer 200 is transmitted to the cloud print service 500.

The printer 200 supports a cloud print function (function of receiving a print job from a cloud print service and printing the received print job), and a Web UI function for operating the printer 200 from the client computer 100. The Web UI function is a function of generating a UI and publishing the generated UI onto a network. The client computer 100 supports a cloud print client function (function of transmitting a file to a cloud print service), and a Web UI client (e.g., Web browser) for operating a Web UI. In addition, the cloud print service 500 represents a cloud print service on the Internet.

First, the user opens a Web UI of the printer 200 using the Web UI client of the client computer 100, and selects on the Web UI a button for registering a printer into a cloud print service. When the button is selected, in step S410, the client computer 100 transmits to the printer 200 a request for registration into the cloud print service 500.

If the printer 200 receives, in step S410, the request for registration into the cloud print service 500, in step S411, the printer 200 transmits to the cloud print service 500 the request for registration into the cloud print service 500. In this manner, in the present exemplary embodiment, a registration request of the printer 200 is transmitted from the Web UI client of the client computer 100 to the cloud print service 500. This request may be enabled to be transmitted by operating an input device included in the printer 200, such as a panel. At this time, a request is not transmitted from the client computer 100, and the printer 200 transmits a registration request of a printer to the cloud print service 500.

The cloud print service registration request transmitted to the cloud print service 500 in step S411 includes information regarding the printer 200. The information regarding the printer 200 includes a name of the printer 200, information (HWID) for identifying a model of the printer, and a COID for identifying a type of the printer such as an inkjet printer or a laser printer. The information regarding the printer 200 further includes interne protocol (IP) address information, and a capability information file regarding a function standardized by the IPP.

If the cloud print service 500 receives a registration request in step S411, in step S412, the cloud print service 500 causes the print queue generation unit 502 to generate a print queue for transmitting a print job to the printer 200. The printer registration unit 501 registers information regarding the printer 200 and capability information into the printer database 510, and generates a record of the printer 200 designated in the registration request. Further, the print queue generation unit 502 generates a print queue. The print queue is generated using a name of a printer (device name), an HWID and a COID for identifying a model of a printer, and an IP address of a printer, which are included in the received information regarding the printer 200.

Next, in step S413, the cloud print service 500 transmits a download request for the driver extension package 303 to the printer driver distribution service 300. The download request is a request for receiving the driver extension package 303 supporting a printer registered in the cloud print service 500. The cloud print service 500 transmits the download request for the driver extension package 303, the HWID, and the COID of the printer 200 to the printer driver distribution service 300.

In step S414, the printer driver distribution service 300 transmits a corresponding driver extension package 303 to the cloud print service 500 based on the received HWID and COID. The printer driver distribution service 300 identifies, from the printer driver database 310, a driver extension package that is a package having an extension flag indicating TRUE and having an HWID corresponding to the received HWID. If a driver extension package having an extension flag indicating TRUE but having an HWID corresponding to the received HWID is not identified, the printer driver distribution service 300 identifies a driver extension package having an extension flag indicating TRUE and having a COID corresponding to the received COID. Then, the printer driver distribution service 300 transmits the identified driver extension package to the cloud print service 500. If a driver extension package can be identified only based on an HWID, in step S413, only an HWID may be transmitted to the printer driver distribution service 300.

Then, in step S415, the cloud print service 500 analyzes the device capability information portion 305 of the downloaded driver extension package 303, and extends the print queue. The cloud print service 500 acquires capability information of the printer 200 from the device capability information portion 305 of the driver extension package 303. Then, the cloud print service 500 updates capability information of the printer that corresponds to the print queue in printer information in the printer database 510. In step S415, the cloud print service 500 overwrites capability information associated with the print queue, with capability information acquired from the driver extension package. Alternatively, the cloud print service 500 may add capability information regarding a setting item not associated with the print queue, from the capability information acquired from the driver extension package, to the capability information corresponding to the print queue. Alternatively, the cloud print service 500 may acquire information indicating a hardware configuration of the printer 200, from the printer 200, and determine capability information based on capability information included in the driver extension package and the hardware configuration information.

By the above-described processing, the print queue of the printer 200 registered in the cloud print service 500 is extended based on vendor-unique device capability information. Then, in step S416, information regarding the printer 200 is registered into the printer database 510. By the above-described processing, the capability information extended by the driver extension package is registered into the printer database 510 as the capability information corresponding to the print queue.

FIG. 5A illustrates an example of the printer database 510 held by the cloud print service 500. A device name indicates a name of a printer (device name) acquired from the printer 200 at a time of registration. An HWID indicates an identifier (identifier unique to a model) to be used for identifying the model of the printer 200. A COID is identification information for identifying the category of a printer, such as information indicating whether the printer 200 is an inkjet printer or a laser beam printer. An IP address indicates an IP address of a connection destination printer 200. A package indicates a package name of a driver extension package 303 to be used for extending a print queue corresponding to the printer. When a print queue is not extended, Null is indicated. Furthermore, in addition to these items, vendor-unique device capability information extended by the driver extension package 303 is registered in the table in a JavaScript (registered trademark) Object Notation (JSON) format, which is not illustrated in FIG. 5A. A format in which the device capability information is stored is not limited to the JSON format, and the device capability information may be stored in another data format. In addition, information regarding a printer and information regarding a user who can use the printer may be stored in the table illustrated in FIG. 5A, in association with each other.

FIG. 9 illustrates an example of capability information stored in association with a print queue. As an example, the capability information is stored in the JSON format, and each setting indicates a function. In addition, each function includes settable options in an array format.

Capability information 901 indicates standard capability information defined by the IPP. "Duplex" is a setting item regarding a duplex function, and indicates that "Duplex" indicating duplex printing and "One-Sided" indicating one-sided printing are included as options of the setting item. "Color" is a setting item regarding color printing, and indicates that "Mono" indicating monochrome printing and "Color" indicating color printing are included as options. "Orientation" is a setting item regarding the orientation of a sheet to be used for printing, and indicates that "Portrait" indicating a vertically-long direction, and "Landscape" indicating a horizontally-long direction are included as options. In capability information provided from the printer 200 to the cloud print service 500, these setting items and options are standard setting items and options defined by the IPP. By extending device capability information using a driver extension package, even standard setting items defined by the IPP that are described in the capability information 901 can include options unique to a vendor. For example, by extending "Staple" being a setting item regarding binding of sheets, in addition to "Staple left top" indicating binding at a left-top one point, which is a standard option, "Saddle Stitch" indicating saddle stitching becomes settable.

Capability information 902 is capability information extended by the driver extension package 303, and is capability information regarding setting items unique to a vendor, for example. The capability information 902 includes Extension_Setting1 and Extension_Setting2 as functions, and Extension_option1 and Extension_option2 as options of the functions. Examples of Extension settings include a setting regarding mixed sheet printing for executing one job using a plurality of types of sheets. If the function is a sheet mixed function, a character string indicating mixed sheet printing is described in "Extension_Setting1". Then, a character string indicating an option indicating that A3 sheets and A4 sheets are to be used, for example, is described in "Extension_option1", and a character string indicating an option indicating that B4 sheets and B5 sheets are to be used is described in Extension_option2". An option that cannot be selected in standard capability information defined by the IPP may be included in the device capability information portion of the driver extension package 303.

In other words, a plurality of definitions can be made for an extension function. FIG. 9 illustrates the JSON format as an example, but another data format may be used.

Figure 8A:
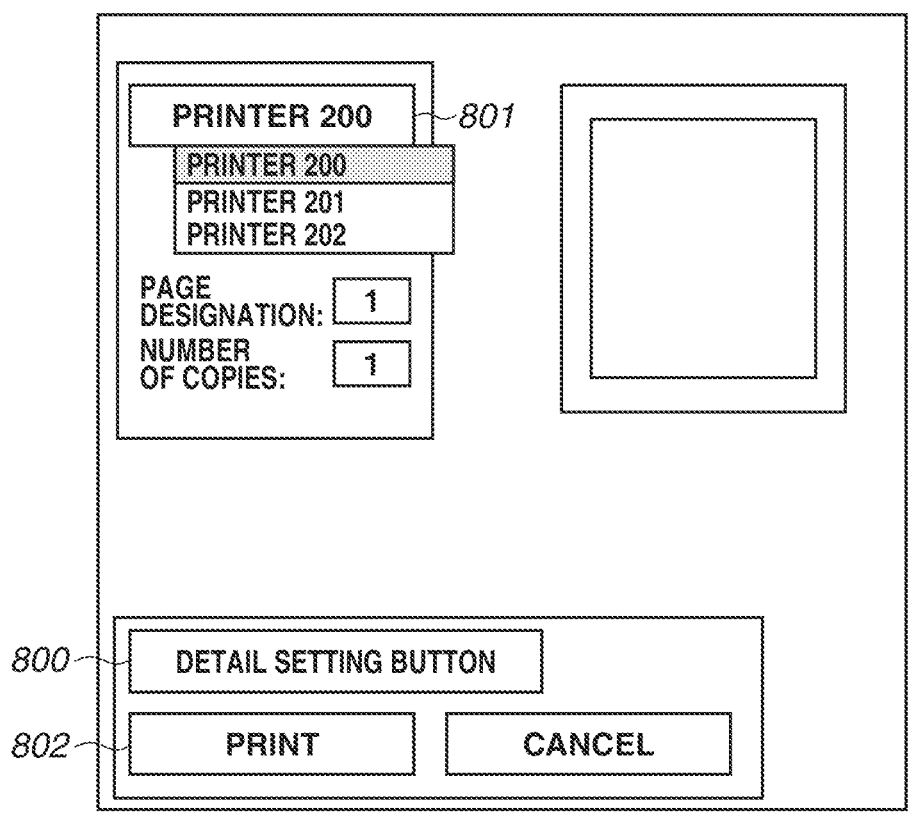
FIG. 8A is a diagram illustrating an example of a user interface (UI) for changing a print setting according to the first exemplary embodiment.
Figure 8B:
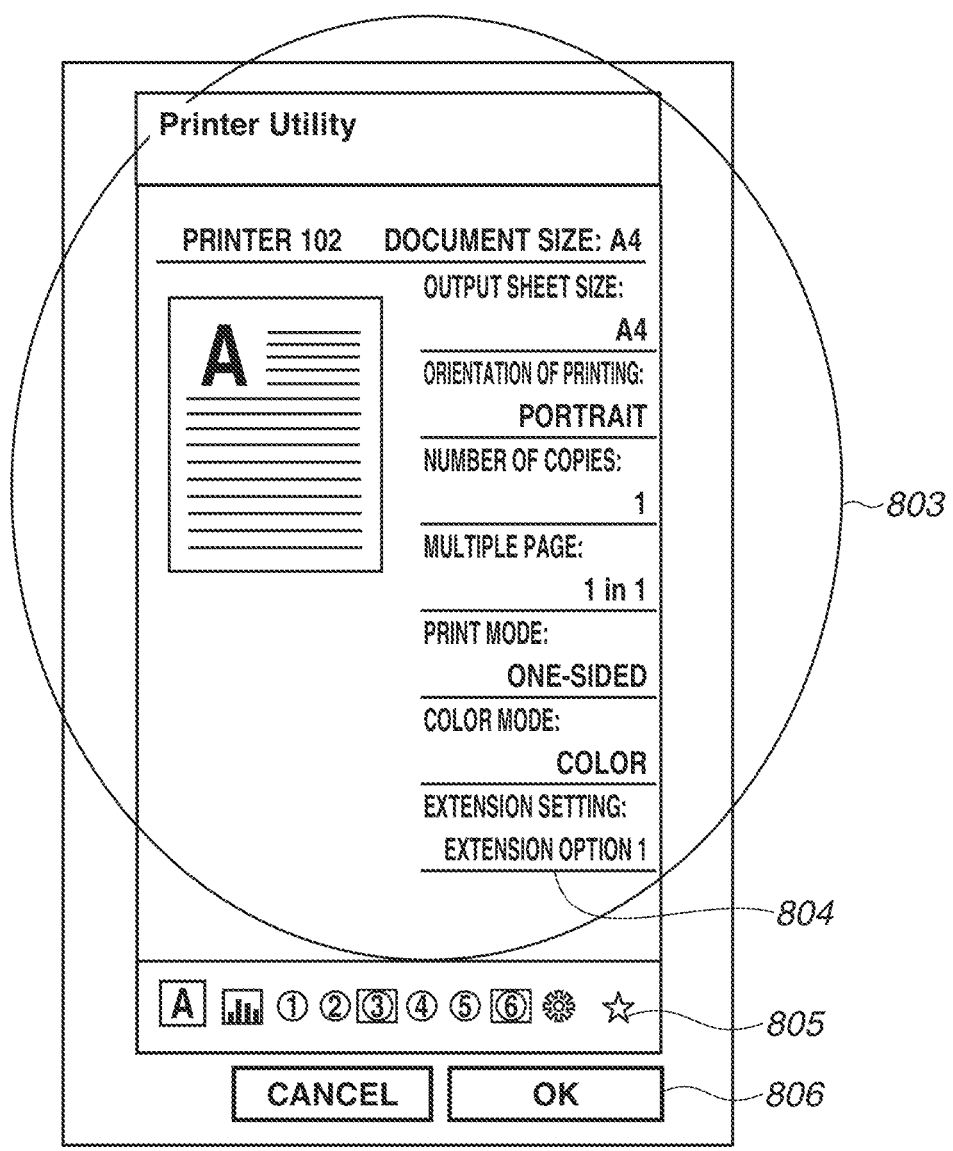
FIG. 8B is a diagram illustrating an example of a UI for changing a print setting according to the first exemplary embodiment.

Based on these pieces of information, the printing extension application 1052 generates a print setting screen illustrated in FIG. 8B.

Referring back to FIG. 4, if the registration into the printer database 510 is completed, in step S417, the cloud print service 500 transmits a cloud print service registration request response including a registration URL for cloud print registration, and a registration URL presentation request to the printer 200.

In step S418, the printer 200 receives the cloud print service registration request response and the registration URL presentation request, and outputs registration URL information. In step S418, the printer 200 notifies the user of the registration URL by displaying the registration URL on the monitor 110, or printing a sheet on which registration URL information is described. In addition, the printer 200 may notify the client computer 100 of the registration URL via a Web UI.

In step S419, the user accesses the cloud print service 500 identified by the registration URL presented from the printer 200. At this time, because the user needs to log in a cloud account accessible to the cloud print service 500, the user needs to input a user ID and a password.

Based on the cloud account and the registration URL including printer information, the cloud print service 500 associates the user and the printer 200 with each other. As an associating method, for example, there is a method of associating printer information and a user token with each other. However, the associating method is not limited to this method. Then, in step S420, the cloud print service 500 transmits to the printer 200 a user token including information regarding the cloud print service 500, and ends the registration processing of the printer 200 into the cloud print service 500. Then, the printer 200 accesses the cloud print service 500 using the user token.

The printer driver database 310 referred to in step S413 of FIG. 4 will now be described. FIG. 5B illustrates an example of the printer driver database 310 held by the printer driver distribution service 300. A package name indicates a name of a package acquired from the driver information portion 304 at the time of registration. An HWID indicates identification information (identification information unique to a model) used for identifying a model of the printer 200. A COID is identification information for identifying a category of a printer that uses a corresponding driver. A package indicates a name of a package including the driver extension package 303. The package may be information such as a file path, as long as it is possible to identify a driver or a driver extension package corresponding to the record based on the information. Extension indicates whether the driver extension package 303 is an extension file. If extension indicates "FALSE", a corresponding package is not an extension package but a printer driver. On the other hand, if extension indicates "TRUE", a corresponding package is not a printer driver but a package for extending a driver. An application identifier is identification information for identifying an application to be used when a print setting screen is extended using capability information stored in a corresponding driver extension package. In the present exemplary embodiment, only a driver extension package includes an application identifier, but a printer driver may also include an application identifier.

The printer driver registration unit 301 analyzes the driver information portion 304 when registering a package into the printer driver database 310. The printer driver registration unit 301 acquires a package name, an HWID, a COID, and information indicating whether a corresponding package is a driver extension package, and registers the acquired information into the printer driver database 310 together with the driver extension package 303.

Next, the description will be given of the application database 410 to be referred to in step S617 of FIG. 6, which will be described below. FIG. 5C illustrates an example of the application database 410 held by the printing extension application distribution service 400. An application name is a name of an application registered in the database including the printing extension application 1052. An application identifier is information for identifying an application including the printing extension application 1052. An application package is a file path in which an application including the printing extension application 1052 is stored. The application package may be a name of a folder in which the application is stored, as long as it is possible to identify a package of a registered printing extension application based on the information.

The application registration unit 401 analyzes the setting file portion 10521 and acquires an application name and an application identifier. The application registration unit 401 registers the above-described information into the application database 410 together with the printing extension application 1052.

Next, processing performed when a print queue of the printer 200 registered in the cloud print service 500 is generated on the client computer 100, and a printing extension application is installed will be described with reference to FIG. 6.

FIG. 6 is a sequence diagram illustrating a sequence of processing of installing the printing extension application 1052 onto the client computer 100 according to the present exemplary embodiment.

When the client computer 100 outputs print data to the printer 200 using cloud print, the client computer 100 transmits a print job to the cloud print service 500. Thus, a print queue for transmitting a print job to the cloud print service 500 is to be generated on the client computer 100.

In the present exemplary embodiment, using a printer search function included in the OS 1053 as a standard function, a print queue of a printer registered in the cloud print service 500 is generated. Typically, when printer search is performed, a printer existing on the same intranet becomes a search target. For example, in FIG. 2, if the client computer 100 performs printer search, the client computer 100 can discover the printer 200 but cannot discover the printers 201 and 202 existing on another intranet. In the present exemplary embodiment, the client computer 100 can access the cloud print service 500. When a printer is registered in the cloud print service 500, the printer registered in the cloud print service 500 can be discovered by printer search. In the present exemplary embodiment, in addition to the above-described printer 200, the printers 201 and 202 are registered in the cloud print service 500, and these printers can also be discovered using the printer search function of the OS 1053.

In step S610, the client computer 100 performs printer search, which is the above-described standard function of the OS 1053. In step S610, the client computer 100 searches for a printer registered in the cloud print service 500, in addition to a printer existing on the same intranet as the client computer 100. The client computer 100 accesses the cloud print service 500, and transmits to the cloud print service 500 a list request for printer information registered on the cloud print service 500.

If information regarding printer search is received, the search response unit 504 of the cloud print service 500 presents available printers to the client computer 100. For presenting the available printers, in step S611, the cloud print service 500 generates a printer list including printer information available to a user who is accessing the cloud print service 500 from the client computer 100. The printer information includes a name of a printer (device name), an HWID for identifying a model of the printer, and an IP address of the printer as described above. The printer list including the printer information is generated by the printer list generation unit 503 of the cloud print service 500 using information stored in the printer database 510.

In step S612, the cloud print service 500 returns the generated printer list to the client computer 100. At this time, information such as an HWID and a COID, which serves as printer identification information described in FIG. 5A, is also included in the printer information of the transmitted printer list. Based on the printer list, the client computer 100 displays a selection screen of printers available to the user, on the monitor 110. The user selects from the presented printer list a printer desired to be used.

In step S613, the OS 1053 of the client computer 100 installs the cloud driver 1050 to be used in the cloud print service 500, and generates a print queue of the selected printer. The client computer 100 acquires information regarding the printer selected by the user, from the cloud print service 500, and generates a print queue using the acquired information. The client computer 100 generates a print queue based on an HWID, a COID, an IP address, and capability information of the printer that have been acquired from the cloud print service 500. If the cloud driver 1050 has already been installed on the client computer 100, the client computer 100 does not install the cloud driver 1050. The client computer 100 generates a print queue using information regarding the printer that has been acquired from the cloud print service 500.

Furthermore, if the OS 1053 of the client computer 100 has succeeded to generate the print queue, in step S614, the OS 1053 transmits a download request for the driver extension package 303 to the printer driver distribution service 300. The client computer 100 transmits an HWID, a COID, and an acquisition request for a driver extension package to the cloud print service 500. The client computer 100 may transmit either an HWID or a COID to the cloud print service 500.

If the printer driver distribution service 300 receives the download request, in step S615, the printer driver distribution service 300 performs download processing on the client computer 100. The printer driver distribution service 300 identifies a package having an HWID corresponding to the received HWID, from among driver extension packages registered in the printer driver database 310, and transmits the identified package to the client computer 100. If the driver extension packages do not include a package having an HWID corresponding to the received HWID, the printer driver distribution service 300 identifies a driver extension package having a COID corresponding to the received COID. Then, the printer driver distribution service 300 transmits the identified driver extension package to the client computer 100.

In step S616, the OS 1053 of the client computer 100 installs the driver extension package 303, and extends capability information of the above-described print queue generated based on the cloud driver 1050. The client computer 100 updates capability information corresponding to the print queue, with device capability information of the driver extension package. In other words, the client computer 100 extends the print queue of the printer 200 registered in the cloud print service 500, using vendor-unique device capability. If printer capability information has not been acquired from the cloud print service 500, by associating with the print queue capability information included in the driver extension package, the print queue is extended. If capability information has been acquired from the cloud print service 500, by overwriting the capability information acquired from the cloud print service 500 with the capability information included in the driver extension package, the print queue is extended. In addition, if capability information has been acquired from the cloud print service 500, the print queue may be extended by adding capability information that is capability information included in the driver extension package, and not included in the capability information acquired from the cloud print service 500. Furthermore, based on the above-described capability information and hardware configuration information of a printer, a function executable by the printer may be registered in the print queue as capability information.

Next, in step S617, the client computer 100 transmits a download request to the printing extension application distribution service 400. At this time, based on the above-described identifier information of the printing extension application 1052, the OS 1053 issues a download request for the printing extension application 1052 associated with a target printer. In the present exemplary embodiment, in the printing extension application distribution service 400, identifier information of the printing extension application 1052 of the driver extension package 303 and the printing extension application 1052 are associated with each other on a one-to-one basis.

In addition, in the printing extension application distribution service 400, metadata describing information regarding association between identifier information of the printing extension application 1052 and an HWID included in printer information may be stored. In this case, a structure of downloading an appropriate printing extension application 1052 using the metadata is employed.

If the printing extension application distribution service 400 receives the download request, in step S618, the printing extension application distribution service 400 performs download processing on the client computer 100. The application response unit 402 identifies, from the application database 410, an application corresponding to an application identifier notified from the client computer 100. The application response unit 402 transmits the identified printing extension application to the client computer 100. In step S619, the client computer 100 installs the printing extension application 1052.

After the install, in the client computer 100, the printing extension application 1052 and the printer 200 are associated with each other on a one-to-one basis. Accordingly, it becomes possible to present an appropriate print setting UI to the user because the print queue on the client computer 100 includes model information and print setting information of the printer 200. Alternatively, the printing extension application 1052 may communicate with the cloud print service 500, acquire target model information and print setting information, and a UI may be provided using the information. If the install of the printing extension application 1052 is completed, it becomes possible for the user to use a detailed print setting change.

In the present exemplary embodiment, after a print queue is generated on the client computer 100, the client computer 100 accesses the printer driver distribution service 300, and acquires a driver extension package. The client computer 100 may acquire information regarding an extended print queue from the cloud print service 500, without extending a print queue on the client computer 100. In this case, the client computer 100 omits the processing in steps S614 to S616. Alternatively, after the client computer 100 acquires information regarding an extended print queue from the cloud print service 500, the client computer 100 may execute the processing in steps S614 to S616.

Next, the description will be given of a case where the user operates the client computer 100, and performs printing via the cloud print service 500.

If the user uses cloud print, the user issues a printing instruction from the application 1051 of the client computer 100. As a specific example, the user selects a "printing" button from a file menu of the application 1051. In accordance with the printing instruction from the user, the application 1051 issues to the OS 1053 an instruction to display a printing common dialog (print setting screen provided by an OS) illustrated in FIG. 8A. Upon receiving the instruction from the application 1051, the OS 1053 displays the printing common dialog. On the printing common dialog displayed by the OS 1053, a list of printers of which print queues are generated on the client computer 100 can be presented, and the designation of a page to be printed, and the setting of the number of copies can be performed. In a region 801, a name of a print queue generated on the client computer 100 is displayed. In the region 801, in addition to a print queue of a printer connected with the client computer 100 via an intranet, print queues of printers that can be used for printing via the cloud print service 500 are displayed. On the printing common dialog, the user can only perform page designation and the setting of the number of copies that can be set whichever printer is used.

For making a print setting that cannot be made by the user on the printing common dialog, the user selects on the printing common dialog a print queue of a printer desired to be used for output, and selects a detail setting button (object) 800 displayed on the same screen. If the user selects the "detail setting" button, the installed printing extension application 1052 is activated, and the print setting screen illustrated in FIG. 8B is displayed. On the print setting screen provided by the printing extension application 1052, it is possible to make a print setting that cannot be made on the printing common dialog, such as the setting of image processing related to density and color impression, whether or not to print a stamp, and the setting of a punching position or a stapling position.

The print setting screen provided by the printing extension application 1052 will now be described with reference to FIG. 8B.

If the user selects the detail setting button 800 on the printing common dialog, the printing extension application 1052 acquires capability information associated with a print queue generated by the cloud print service 500 on the client computer 100.

Based on the acquired capability information, the execution file unit 10522 generates the print setting screen illustrated in FIG. 8B. A part 803 is a print setting portion. In the part 803, based on capability information of a print queue, a print setting can be changed. A setting 804 is an extension setting portion, and is an operation portion generated based on capability information extended by the driver extension package 303. A region 805 is a region for switching a displayed screen, and changing an item to be set. A button 806 is a determination button. By the button 806 being pressed, setting information is determined, and the determined setting information is delivered to the OS 1053.

If the user selects the "printing" button 802 on the printing common dialog, image data, a print setting set on the printing common dialog, and a print setting set by the printing extension application are transmitted to a print queue. If a print queue set in the region 801 is a print queue of a printer registered in the cloud print service 500, the client computer 100 transmits the image data and the print settings to the corresponding print queue of the cloud print service 500.

Next, processing performed when the user performs printing by operating a printer will be described. If the user logs into the printer 200, the printer 200 transmits to the cloud print service 500 an acquisition request for bibliographic information of a print job registered in a print queue of the cloud print service 500. The bibliographic information to be acquired here is information necessary for displaying a UI of the printer 200, such as a file name of image data, the number of copies to be printed, a color mode, and generated date and time of a print job.

The cloud print service 500 generates a printable job list based on the bibliographic information of the print job stored in the print queue. Then, the cloud print service 500 transmits the generated printable job list to the printer 200. If the printer 200 receives the printable job list transmitted by the cloud print service 500, the printer 200 displays the printable job list on an operation panel. FIG. 7 illustrates an example of an operation panel displaying the printable job list received from the cloud print service 500. The user selects a desired print job on the operation panel, and issues a printing instruction by pressing a print button ("print" 700). If the printer 200 receives a printing execution instruction, the printer 200 transmits to the cloud print service 500 an acquisition request for a print job. The acquisition request includes an ID of a print job desired to be acquired, i.e., a print job ID. By the cloud print service 500 transmitting to the printer 200 a print job corresponding to the received print job ID, printing is executed.

Figure 10:
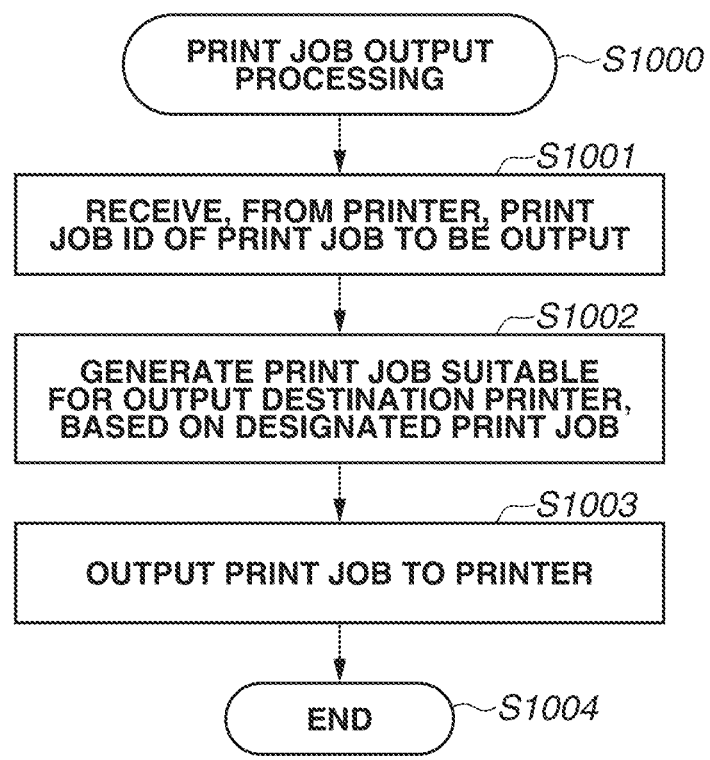
FIG. 10 is a flowchart illustrating printing procedure in the cloud print service according to the first exemplary embodiment.

FIG. 10 is a flowchart illustrating processing performed by the cloud print service 500 according to the present exemplary embodiment when the cloud print service 500 receives an acquisition request for a print job from the printer 200. Unless otherwise specifically stated, the processing is performed by each processing unit of the cloud print service 500. First, in step S1000, print job output processing is started. Next, in step S1001, the print job management unit 505 receives a print job acquisition request (including a print job ID of a print job to be output), from the printer 200.

If the print job management unit 505 receives the request, the print job management unit 505 identifies the designated print job from the print job storage region 511. The print job management unit 505 delivers the identified print job to the print job generation unit 506. In step S1002, the print job generation unit 506 generates a print job suitable for an output destination printer 200, based on the delivered print job.

In step S1003, the print job management unit 505 acquires the generated print job from the print job generation unit 506, and transmits the print job to the printer 200 that has transmitted the printing request. Then, in step S1004, the print job output processing ends.

In the present exemplary embodiment, the printer 200 acquires, from the cloud print service 500, a print job selected by the user by operating the printer 200. The printer 200 may periodically access the cloud print service 500, and acquire a print job managed in association with a print queue of the printer 200, from the cloud print service 500.

Figure 12:
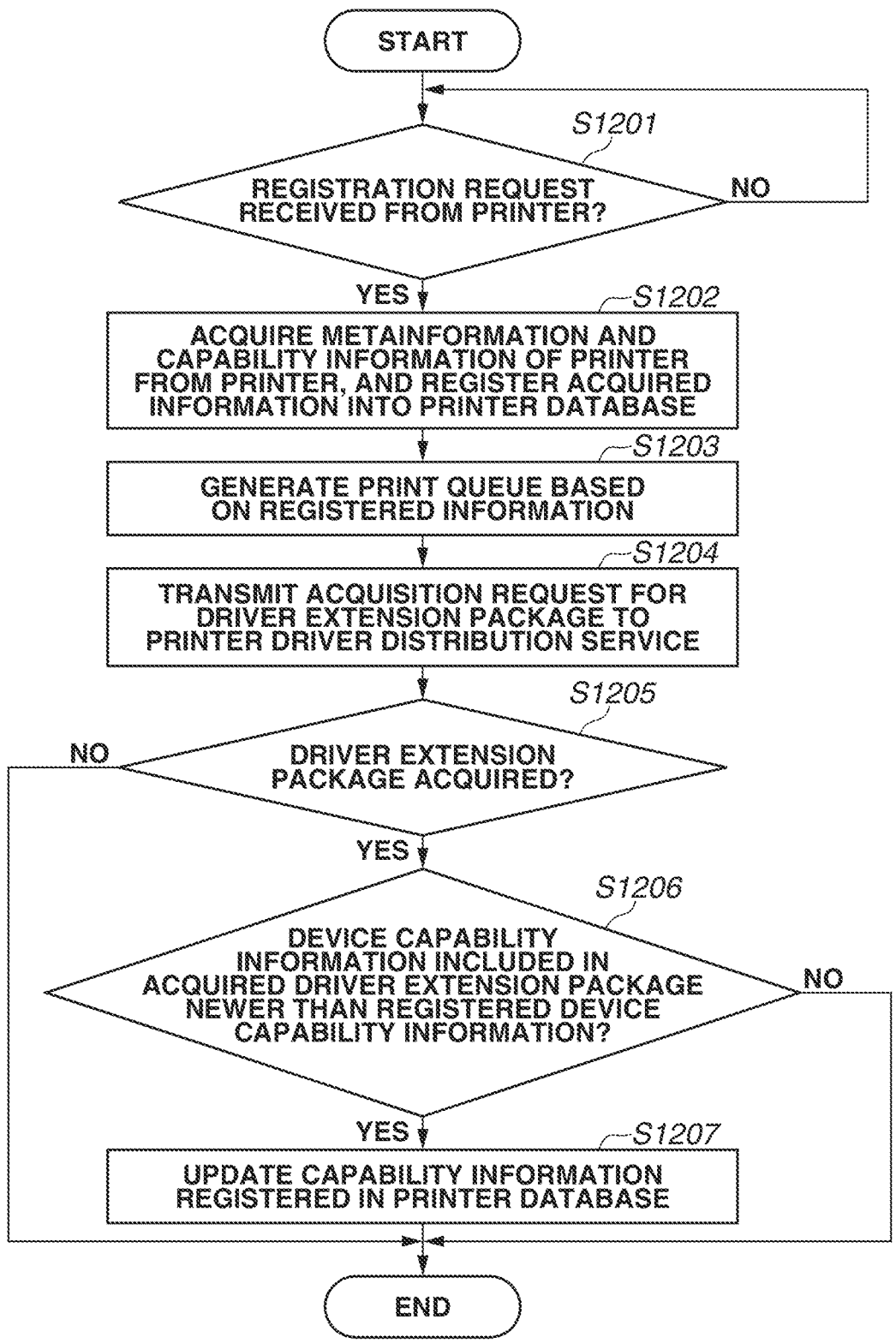
FIG. 12 is a flowchart illustrating a processing procedure of the cloud print service acquiring a driver extension package according to the first exemplary embodiment.

The details of registration processing of a printer into a cloud print service, which is a characteristic operation in the present exemplary embodiment, will be described. FIG. 12 is a flowchart illustrating processing of registering the printer 200 into the cloud print service 500, and extending a print queue by the cloud print service 500. The processing illustrated in FIG. 12 is implemented by a CPU(s) of one or a plurality of information processing apparatuses included in the cloud print service 500, executing a program.

In step S1201, the printer registration unit 501 determines whether a registration request has been received from the printer 200. If a registration request has been received from the printer 200 (YES in step S1201), the printer registration unit 501 advances the processing to step S1202. On the other hand, if a registration request has not been received from the printer 200 (NO in step S1201), the printer registration unit 501 continues the processing in step S1201.

In step S1202, the printer registration unit 501 acquires metainformation and device capability information from the printer 200, and registers the acquired metainformation into the printer database 510. The metainformation includes an HWID and a COID of the printer 200. In addition, the metainformation acquired from the printer 200 includes a version of a file of device capability information provided by the printer 200. The device capability information acquired from the printer 200 is information such as information indicating whether or not duplex printing can be performed, information indicating whether or not monochrome printing or color printing can be performed, and information regarding the orientation of sheets to be used for printing, and is capability information standardized by the IPP. The printer registration unit 501 registers the acquired metainformation and device capability information into the printer database 510. Furthermore, in step S1202, the cloud print service 500 may receive a hardware configuration of the printer 200 from the printer 200.

In step S1203, the print queue generation unit 502 acquires the metainformation and the device capability information from the printer registration unit 501, and generates a print queue of the printer 200.

In step S1204, the printer registration unit 501 transmits an acquisition request for a driver extension package to the printer driver distribution service 300. The printer registration unit 501 transmits the HWID and the COID included in the metainformation acquired from the printer 200, together with the acquisition request for a driver extension package. In the present exemplary embodiment, both the HWID and the COID are transmitted to the printer driver distribution service 300, but either one of the HWID and the COID may be transmitted to the printer driver distribution service 300.

In step S1205, the printer registration unit 501 determines whether a driver extension package has been acquired from the printer driver distribution service 300. For example, if the cloud print service 500 receives from the printer driver distribution service 300 a response indicating that a corresponding driver extension package does not exist, the printer registration unit 501 determines that a driver extension package has not been acquired. Alternatively, if a driver extension package has not been acquired even though a predetermined time elapses from when the acquisition request for a driver extension package is transmitted, the printer registration unit 501 may determine that a driver extension package has not been acquired. If the printer registration unit 501 has not acquired a driver extension package (NO in step S1205), the printer registration unit 501 ends the flowchart illustrated in FIG. 12.

If the printer registration unit 501 has acquired a driver extension package (YES in step S1205), the printer registration unit 501 advances the processing to step S1206.

In step S1206, the printer registration unit 501 determines whether a device capability information file included in the driver extension package acquired from the printer driver distribution service 300 is newer than a device capability information file acquired from the printer 200. The printer registration unit 501 compares the version of the device capability information file acquired from the printer driver distribution service 300, with the version of the device capability information file acquired from the printer 200. If the device capability information file acquired from the printer driver distribution service 300 is a file newer than the device capability information file acquired from the printer 200 (YES in step S1206), the printer registration unit 501 advances the processing to step S1207. In step S1207, whether the device capability information file acquired from the printer driver distribution service 300 is newer than the device capability information file acquired from the printer 200 may be determined based on an item other than the version of the file. For example, a generated date of the device capability information file acquired from the printer 200, and a generated date of the device capability information file acquired from the printer driver distribution service 300 may be compared. If the device capability information file acquired from the printer driver distribution service 300 is not a file newer than the device capability information file acquired from the printer 200 (NO in step S1206), the printer registration unit 501 ends the flowchart illustrated in FIG. 12.

In step S1207, the printer registration unit 501 updates the device capability information file registered in the printer database 510, with the device capability information file acquired from the printer driver distribution service 300. Furthermore, the printer registration unit 501 transmits device capability information to the print queue generation unit 502, and updates device capability information corresponding to a print queue. The printer registration unit 501 overwrites device capability information in the printer database 510 with the device capability information included in the driver extension package. In addition, the printer registration unit 501 may add, to device capability information, items not included in device capability information acquired from the printer, among items of capability information included in the driver extension package. The print queue generation unit 502 may also overwrite device capability information associated with a print queue, with capability information included in a driver extension package, or add capability information not included in capability information acquired from the device. In addition, if a hardware configuration of the printer 200 has been received in step S1202, the printer database 510 may be updated by using a function considered to be executable by the printer 200 in view of the hardware configuration, as capability information.

By performing the processing illustrated in FIG. 12, from among the output of capability information acquired from a printer and the output of capability information included in a driver extension package, newer capability information can be registered into the cloud print service 500. In FIG. 12, from among the output of device capability information acquired from the printer 200 and the output of capability information acquired from the printer driver distribution service 300, newer capability information is registered into the cloud print service 500. Alternatively, the capability information included in a driver extension package acquired from the printer driver distribution service 300 may be always registered into the cloud print service 500.

Figure 11:
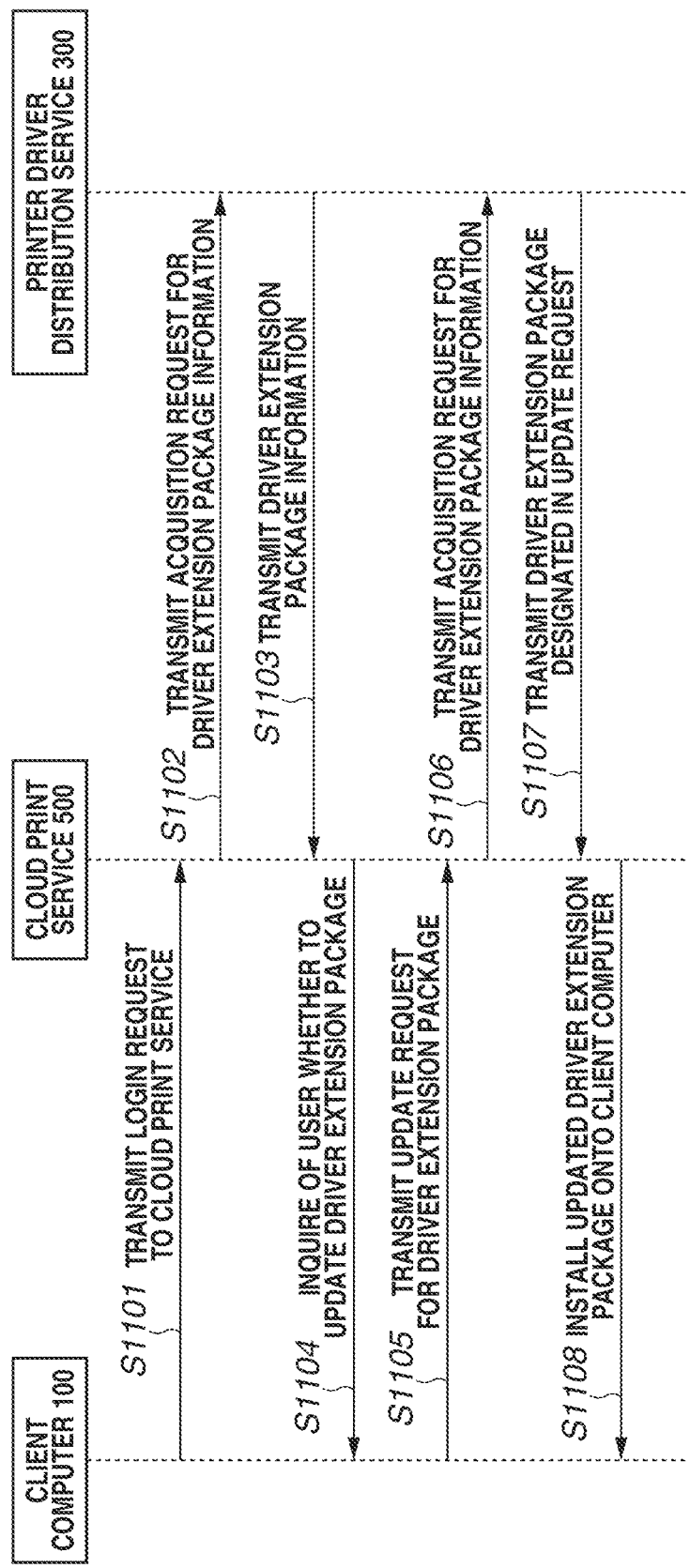
FIG. 11 is a sequence diagram illustrating an example of a sequence of processing of updating a driver extension package according to the first exemplary embodiment.

The description will now be given of processing to be performed if the driver extension package 303 registered in the printer driver database 310 of the printer driver distribution service 300 is updated. FIG. 11 is a sequence diagram illustrating a sequence of processing performed when a driver extension package registered in the printer driver distribution service 300 is updated.

The driver extension package 303 is updated by a driver extension package distributed by a vendor being registered into the printer driver database 310 by the printer driver registration unit 301 of the printer driver distribution service 300. If the driver extension package 303 registered in the printer driver distribution service 300 is updated, it is desirable that a driver extension package corresponding to a print queue registered in the cloud print service 500 is also updated. For this reason, a driver extension package registered in the cloud print service 500 is updated by performing the following processing.

In step S1101, the client computer 100 accesses the cloud print service 500, and transmits a login request to the cloud print service 500. The user accesses the cloud print service 500, inputs a user ID and a password, to log into the cloud print service 500. Based on the input user ID and password, the cloud print service 500 performs user authentication.

If the user authentication has succeeded, in step S1102, the cloud print service 500 transmits to the printer driver distribution service 300 an acquisition request for driver extension package information as for printer information associated with the user. The cloud print service 500 transmits an HWID and a COID of a printer associated with the user who has logged into the printer driver distribution service 300. In step S1102, the cloud print service 500 may transmit either one of an HWID and a COID.

In step S1103, the printer driver distribution service 300 transmits to the cloud print service 500 package information of a driver extension package associated with the HWID received from the cloud print service 500. The printer driver distribution service 300 transmits package information of a driver extension package stored in the printer driver database 310. The package information transmitted in this step includes version information of the driver extension package, and latest update date and time information.

The cloud print service 500 compares the received package information of the driver extension package, and driver extension package information stored in association with a print queue, and determines whether the driver extension package needs to be updated. For example, the cloud print service 500 compares version information of the driver extension package registered in the printer database 510, and version information of the driver extension package received from the printer driver distribution service 300. If the version of the driver extension package received from the printer driver distribution service 300 has a value indicating a newer version, the processing proceeds to step S1104, which will be described below. The cloud print service 500 may compare the update date and time of the driver extension package received from the printer driver distribution service 300, and the update date and time of the driver extension package stored in the printer database 510. If the update date and time of the driver extension package received from the printer driver distribution service 300 are later date and time, the cloud print service 500 advances the processing to step S1104. If a driver extension package installed on the cloud print service 500 is the latest package, the processing in step S1104 and subsequent steps is not performed, and the sequence illustrated in FIG. 11 ends.

In step S1104, the cloud print service 500 causes the client computer 100 to display a screen for inquiring of the user whether to update a driver extension package requiring update. In step S1104, for example, a list of information regarding printers requiring the update of driver extension packages is displayed, and the user is allowed to select a printer of which a driver extension package is to be updated.

If the user issues an update request for a driver extension package, in step S1105, the client computer 100 transmits to the cloud print service 500 an update request for a driver extension package of the printer selected by the user.

In step S1106, the cloud print service 500 transmits an acquisition request for a driver extension package to the printer driver distribution service 300. In step S1106, the cloud print service 500 transmits an HWID and a COID of the printer for which an update instruction has been issued by the user, to the printer driver distribution service 300. In step S1106, the cloud print service 500 may transmit only either one of an HWID and a COID to the printer driver distribution service 300.

In step S1107, the printer driver distribution service 300 transmits to the cloud print service 500 a driver extension package identified based on the received HWID. The cloud print service 500 updates a driver extension package pre-stored in association with the printer information, with the received driver extension package. In this way, the driver extension package registered in the cloud print service 500 can be updated to the latest driver extension package registered in the printer driver distribution service 300. In the above-described example, a driver extension package is updated in response to an update instruction issued by the user. If a driver extension package distributed by the printer driver distribution service 300 is updated, a new driver extension package may be installed on the cloud print service 500 without making an inquiry to the user.

In step S1108, the cloud print service 500 installs the updated driver extension package also onto the client computer 100. The client computer 100 acquires the updated driver extension package from the cloud print service 500, and updates the information regarding a driver extension package stored in the client computer 100.

In FIG. 11, in step S1102 in which the user logs into the cloud print service 500, an acquisition request for driver extension package information registered in the printer driver distribution service 300 is transmitted. The cloud print service 500 may transmit an acquisition request for driver extension package information to the printer driver distribution service 300 every predetermined time or on determined date and time.

In addition, in FIG. 11, the processing in step S1102 is executed at a timing at which the user logs into the cloud print service 500. The processing in step S1102 and subsequent steps may be executed if the user who has logged into the cloud print service 500 has an authority to perform management of printer information in the cloud print service 500.

By executing the above-described processing, capability information of a printer registered in the cloud print service 500 can be extended using capability information provided by another server system different from the cloud print service 500.

Other Embodiments

The exemplary embodiment of the present invention can also be implemented by executing the following processing. Specifically, the processing is processing of supplying software (program) for implementing the functions of the above-described exemplary embodiment, to a system or an apparatus via a network or various storage media, and a computer (or a CPU or a micro processing unit (MPU)) of the system or the apparatus reading a program code and executing the program code. In this case, the computer program and a storage medium storing the computer program are included in the present invention.

Capability information not provided from a printing apparatus registered in a server system according to the exemplary embodiment can be registered into the server system.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-015841, filed Jan. 31, 2020, which is hereby incorporated by reference herein in its entirety.

What is claimed is:

1. A server system comprising:
a controller configured to:
receive first capability information of a printing apparatus from the printing apparatus;
receive information regarding the printing apparatus, from the printing apparatus;
transmit the received information to a different server system;
receive, from the different server system, second capability information of the printing apparatus that is identified by the different server system based on the transmitted information; and
transmit capability information including the first capability information and the second capability information to an information processing apparatus, wherein the transmitted capability information is to be used for displaying a print setting screen.

2. The server system according to claim 1, wherein the second capability information is not included in the first capability information.

3. The server system according to claim 1,
wherein the controller is further configured to store the information regarding the printing apparatus in association with the capability information transmitted to the information processing apparatus.

4. The server system according to claim 1, wherein the information regarding the printing apparatus is information indicating a model of the printing apparatus.

5. The server system according to claim 1, wherein the information is information indicating identifying a type of the printing apparatus.

6. The server system according to claim 1, wherein the controller is further configured to:
receive a request from the information processing apparatus, wherein the capability information is transmitted to the information processing apparatus based on the received request.

7. The server system according to claim 6,
wherein the capability information transmitted to the information processing apparatus is specified based on the received request.

8. The server system according to claim 1, wherein the different server system stores a first package including a driver of the printing apparatus, and a second package including the second capability information that is not included in the driver.

9. The server system according to claim 8, wherein the server system transmits a request for acquiring the second package based on the information, to the different server system.

10. The server system according to claim 1, wherein the first capability information is information according to a predetermined protocol.

11. The sever system according to claim 10, wherein the predetermined protocol is the Internet Printing Protocol.

12. The server system according to claim 10, wherein the second capability is not defined by the predetermined protocol.

13. The server system according to claim 1, wherein the capability information transmitted to the information processing apparatus is information that the second capability information is added to the first capability information.

14. The information processing apparatus according to claim 1, wherein the information regarding the printing apparatus is information to be used for acquiring the second capability information.

15. The information processing apparatus according to claim 1, wherein the controller is further configured to:
receive a request for registering the information regarding the printing apparatus with the server system from the printing apparatus, wherein the first capability information is transmitted from the printing apparatus that has been transmitted the request.

16. A method for controlling a server system, the method comprising:
receiving first capability information of a printing apparatus from the printing apparatus;
receiving information regarding the printing apparatus, from the printing apparatus;
transmitting the received information to a different server system;
receiving, from the different server system, second capability information of the printing apparatus that is identified by the different server system based on the transmitted information; and
transmitting capability information including the first capability information and the second capability information to an information processing apparatus, wherein the transmitted capability information is to be used for displaying a print setting screen.

* * * * *